(12) United States Patent
Ikuta et al.

(10) Patent No.: US 9,314,913 B2
(45) Date of Patent: Apr. 19, 2016

(54) DUST COLLECTING DEVICE AND IMPACT TOOL

(75) Inventors: Hiroki Ikuta, Anjo (JP); Ken Yamauchi, Anjo (JP); Takamasa Hanai, Anjo (JP); Yoshitaka Machida, Anjo (JP); Masanori Higashi, Anjo (JP); Tatsuo Nakashima, Anjo (JP); Yoshinori Sasaki, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 616 days.

(21) Appl. No.: 13/807,789

(22) PCT Filed: Jul. 4, 2011

(86) PCT No.: PCT/JP2011/065307
§ 371 (c)(1),
(2), (4) Date: Mar. 11, 2013

(87) PCT Pub. No.: WO2012/005222

PCT Pub. Date: Jan. 12, 2012

(65) Prior Publication Data

US 2014/0020922 A1     Jan. 23, 2014

(30) Foreign Application Priority Data

Jul. 8, 2010   (JP) ................. 2010-156038

(51) Int. Cl.
*B25D 17/20*   (2006.01)
*B25D 17/22*   (2006.01)
(Continued)

(52) U.S. Cl.
CPC ............ *B25D 17/22* (2013.01); *B23Q 11/0046* (2013.01); *B25D 17/04* (2013.01); *Y02P 70/171* (2015.11)

(58) Field of Classification Search
CPC ............... B25D 17/20; B25D 17/22; B25D 2217/0065; B23Q 11/0071; B23Q 11/0042; B23Q 11/006
USPC ......................... 173/198, 217, 171
See application file for complete search history.

(56) References Cited

U.S. PATENT DOCUMENTS 5,129,467 A * 7/1992 Watanabe .......... B23Q 11/0046
                                                    173/217
2007/0261195 A1    11/2007 Bleicher et al.
(Continued)

FOREIGN PATENT DOCUMENTS

DE      27 10966 C2    3/1987
DE      41 17 496 A1   12/1992
(Continued)

OTHER PUBLICATIONS

Sep. 27, 2011 International Search Report issued in International Patent Application No. PCT/JP2011/065307.
(Continued)

*Primary Examiner* — Michelle Lopez
(74) *Attorney, Agent, or Firm* — Oliff PLC

(57) ABSTRACT

In a dust collection device that collects dust particles that an impact tool generates, disclosed is a feature that can accommodate the lengths of tool bits that are mounted to the impact tool when a machining operation is executed by exchanging tool bits of different lengths. The dust collection device collects dust that the impact tool generates and is attached to said impact tool that, in the lengthwise direction, linearly operates the tool bit mounted to the end region of a tool body. The dust collection device has a dust intake port that sucks dust, and said dust intake port can be repositioned in the lengthwise direction of the tool bit in accordance with the length in the lengthwise direction of said tool bit.

7 Claims, 10 Drawing Sheets

(51) Int. Cl.
*B25D 17/04* (2006.01)
*B23Q 11/00* (2006.01)

(56) References Cited

U.S. PATENT DOCUMENTS

2007/0264091 A1 11/2007 Bleicher et al.
2011/0308830 A1 12/2011 Furusawa et al.

FOREIGN PATENT DOCUMENTS

| FR | 2 702 171 A1 | 9/1994 |
| GB | 2262159 A | 6/1993 |
| JP | U1-51-92780 | 7/1976 |
| JP | U-51-82093 | 7/1976 |
| JP | U-63-47812 | 3/1988 |
| JP | U-3-124805 | 12/1991 |
| JP | A-2005-305577 | 11/2005 |
| JP | A-2007-283415 | 11/2007 |
| JP | A-2007-301717 | 11/2007 |
| JP | A-2007-303271 | 11/2007 |
| WO | WO 2010/070977 A1 | 6/2010 |

OTHER PUBLICATIONS

Jan. 8, 2013 International Preliminary Report on Patentability issued in Application No. PCT/JP2011/065307 (with translation).
Apr. 22, 2014 Extended European Search Report issued in European Application No. 11 80 3556.
Office Action issued in Chinese Application No. 201180033255.2 dated Jun. 17, 2014 (with translation).
Jan. 28, 2015 Office Action issued in Chinese Patent Application No. 201180033255.2.
Jun. 22, 2015 Office Action issued in Russian Patent Application No. 2013105330.
Aug. 13, 2015 Office Action issued in Chinese Application No. 201180033255.2.
Oct. 23, 2015 Office Action issued in Russian Patent Application No. 2013105330.

\* cited by examiner

DUST COLLECTING DEVICE AND IMPACT TOOL

FIELD OF THE INVENTION

The invention relates to a dust collecting device for collecting dust generated by an impact tool, and an impact tool having the dust collecting device.

BACKGROUND OF THE INVENTION

In an impact tool which performs a hammering operation or a hammer drill operation by a tool bit on a workpiece such as concrete, dust is generated during operation. Therefore, some conventional impact tools are provided with a dust collecting device for collecting dust generated during operation. For example, Japanese non-examined laid-open Patent Publication No. 2007-303271 discloses a dust collecting device having a cylindrical hood which is arranged to surround a tool bit. In this dust collecting device, dust generated by operation is sucked up through a front end opening of the hood and collected via a pipe and a dust transfer passage formed within the impact tool body.

The above-described known dust collecting device is configured such that the front end of the hood is fixed in position with respect to the tool body. Therefore, for example, when a longer tool bit than usual is used, the distance between the hood front end and a dust generation area is increased, so that the dust collecting efficiency is reduced.

DISCLOSURE OF THE INVENTION

Problems to be Solved by the Invention

It is, accordingly, an object of the present invention to provide a technique for accommodating different lengths of tool bits which are mounted to an impact tool when replacing the tool bits having different lengths, in a dust collecting device for collecting dust generated by the impact tool.

Means for Solving the Problem

In order to solve the above-described problem, in a preferred embodiment according to the present invention, a dust collecting device is provided which is attached to an impact tool and collects dust generated by the impact tool. In the impact tool, a tool bit coupled to a front end region of a tool body is caused to rectilinearly move in an axial direction of the tool bit. The dust collecting device has a dust suction port through which dust is sucked up, and the dust suction port can be adjusted in position in the axial direction of the tool bit according to the length of the tool bit coupled to the tool body. The manner in which the dust suction port "can be adjusted in position in the axial direction" in this invention refers to the manner in which the dust suction port can be moved in the axial direction and fixed in that position.

In the dust collecting device according to this invention, the position of the dust suction port can be adjusted according to the length of the tool bit which is selectively coupled to the tool body. Therefore, the dust suction port can be adequately positioned with respect to the tip of the tool bit to be used, and dust generated by operation can be efficiently collected. Further, it is not necessary to prepare a plurality of dust collecting devices so as to accommodate tool bits of different lengths.

According to a further embodiment of this invention, the dust collecting device can be attached to the tool body and includes a dust collecting part having the dust suction port at its front end, and a dust transfer part which is connected to the dust collecting part in order to transfer dust downstream from the dust suction port. The position of the dust suction port can be adjusted in the axial direction of the tool bit by changing a mounting position of the dust transfer part with respect to the tool body. The manner of "changing a mounting position of the dust transfer part with respect to the tool body" in this invention suitably includes the manner of providing one mounting area for mounting the dust transfer part in a fixed position of the tool body and changing the mounting position of the dust transfer part with respect to the mounting area, and the manner of providing a plurality of mounting areas on the tool body and changing the mounting position of the dust transfer part with respect to the mounting areas.

According to this invention, by changing the mounting position of the dust transfer part with respect to the tool body, the front end of the dust collecting part or the dust suction port can be adequately positioned with respect to the tip of the tool bit to be used.

According to a further embodiment of this invention, the dust transfer part is formed by a dust collecting hose which extends in the axial direction of the tool bit and a bellows-like part is formed at least in part of the dust collecting hose. The dust collecting device further includes a hose holding part which can be mounted to the tool body and engaged with the bellows-like part so as to hold the dust collecting hose on the tool body. Further, the position of the dust suction port can be adjusted by changing an engagement position of the bellows-like part in the axial direction with respect to the hose holding part. The manner of being "engaged with the bellows-like part" in this invention typically represents the manner in which one or more projections are inserted in a valley of the bellows-like part.

According to this invention, the position of the dust suction port can be adjusted by changing the engagement position of the bellows-like part of the dust collecting hose with respect to the hose holding part mounted on the tool body.

According to a further embodiment of this invention, the hose holding part includes an annular member through which the dust collecting hose is loosely inserted, an engagement member which is formed on the annular member and can be engaged with the bellows-like part, and a biasing member which constantly biases the engagement member in a direction in which the engagement member is engaged with the bellows-like part. Further, the engagement member can be moved in a radial direction of the annular member between a position of engagement with the bellows-like part and a position of disengagement from the bellows-like part.

According to this invention, the position of the dust suction port can be adjusted with respect to the tool bit by moving the engagement member to be disengaged from the bellows-like part and then moving the dust collecting hose in the axial direction. Once the position of the dust suction port is adjusted, engagement between the engagement member and the bellows-like part is maintained by the biasing member. Therefore, there exists no risk that the position of the dust suction port is unintentionally changed due to vibration caused by the operation.

According to a further embodiment of this invention, the dust collecting device has a bit covering which is arranged to surround the tool bit and has the dust suction port formed at its front end. The bit covering is formed by a plurality of cylindrical members which are fitted one on the other and can be moved relative to each other in the axial direction of the tool bit, and the position of the dust suction port can be adjusted by relative movement of the cylindrical members.

According to this invention, the position of the dust suction port can be easily adjusted by moving the cylindrical members fitted one on the other, with respect to each other in the axial direction.

According to a further embodiment of this invention, a female thread is formed in one of the cylindrical members and an engagement projection is formed on the other and engages with the female thread, and when turned relative to each other in the circumferential direction, the cylindrical members can be moved relative to each other in the axial direction by engagement between the female thread and the engagement projection.

According to this invention, stepless position adjustment can be realized by using the threads.

According to a further embodiment of this invention, the cylindrical members can be moved relative to each other in the axial direction and the circumferential direction, and one of the cylindrical members has a recess and the other has a projection which can be engaged with and disengaged from the recess by relative movement of the cylindrical members in the circumferential direction. Further, at least one of the recess and the projection is arranged in plurality in the axial direction of the cylindrical members.

Vibration is generated by operation of an impact tool mainly in the axial direction of the tool bit. According to this invention, with the construction in which the projection and the recess are engaged and disengaged by moving the cylindrical members relative to each other in the circumferential direction, the dust collecting device is less subject to the vibration, so that engagement between the recess and the projection can be maintained.

According to a further embodiment of this invention, the cylindrical members can be telescopically slid with respect to each other in the axial direction, and a projection is formed on one of a sliding inner surface of one cylindrical member and a sliding outer surface of the other adjacent cylindrical member, and a recess is formed in the other of the sliding inner surface and the sliding outer surface and can be engaged with and disengaged from the projection. The projection and the recess are engaged and disengaged by elastic deformation of the cylindrical members.

According to this invention, with the construction in which the dust collecting device is operated only in the axial direction and the projection and the recess are engaged and disengaged by elastic deformation, the dust collecting device is easy to operate.

According to a further embodiment of this invention, the impact tool can be provided with the dust collecting device which can be attached to the tool body and in which the position of the dust suction port can be adjusted according to the length of the tool bit to be used for operation.

Effect of the Invention

According to this invention, a dust collecting device for collecting dust generated by an impact tool is capable of accommodating different lengths of tool bits which are coupled to the impact tool when replacing the tool bits having different lengths.

Other objects, features and advantages of the present invention will be readily understood after reading the following detailed description together with the accompanying drawings and the claims.

REPRESENTATIVE EMBODIMENT OF THE INVENTION

Each of the additional features and method steps disclosed above and below may be utilized separately or in conjunction with other features and method steps to manufacture and use improved dust collecting devices and impact tools and methods for using them and devices utilized therein. Representative examples of the present invention, which examples utilized many of these additional features and method steps in conjunction, is now described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

(First Embodiment of the Invention)

Figure 1:
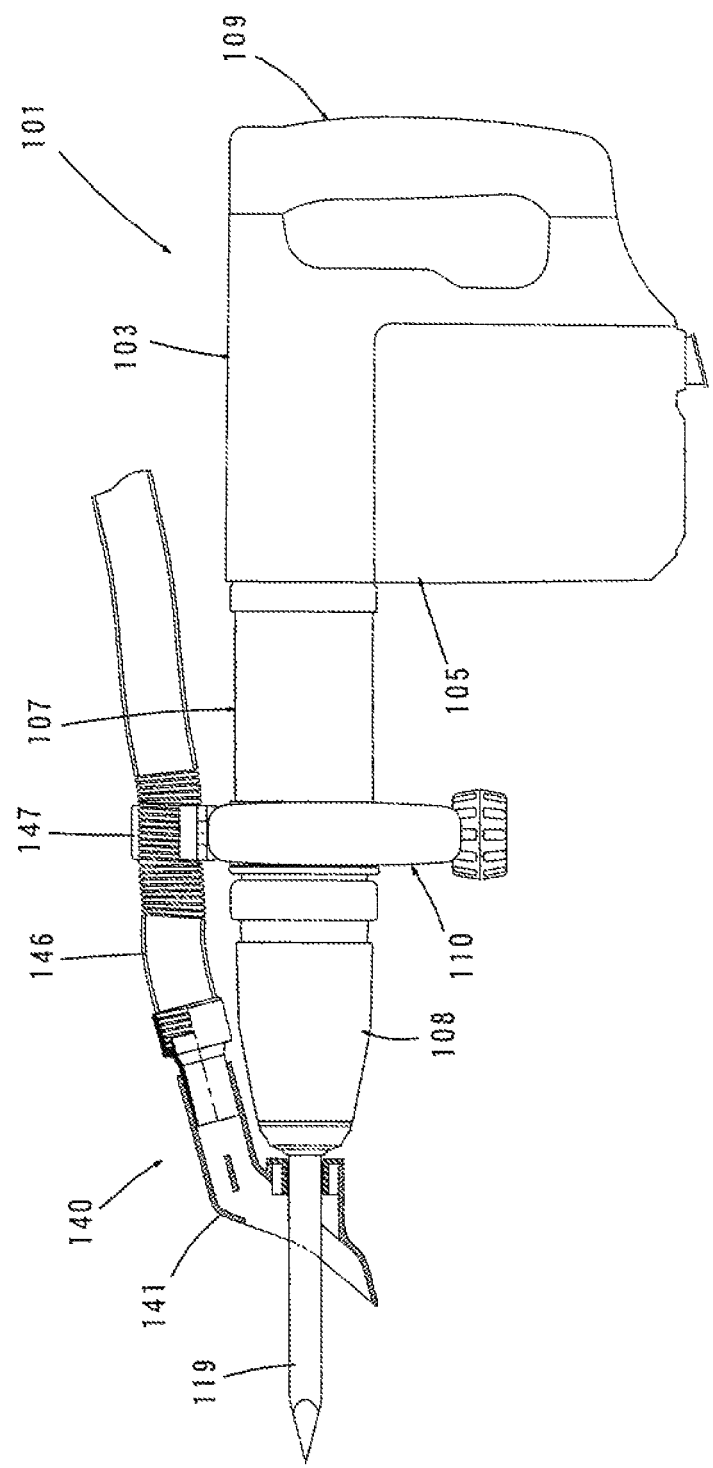
FIG. 1 is an external view showing an entire electric hammer with a dust collecting device according to a first embodiment of the present invention.

A dust collecting device according to a first embodiment of the present invention is now described with reference to FIGS. 1 to 7. This embodiment is explained as being applied to an electric hammer as a representative example of an impact tool. FIG. 1 shows an electric hammer 101 having an auxiliary handle in the form of a side handle 110 mounted thereon and a dust collecting device 140 attached to the side handle 110. The construction of the electric hammer 101 is now briefly explained with reference to FIG. 1. The hammer 101 mainly includes a body 103 that forms an outer shell of the hammer 101, an elongate hammer bit 119 detachably coupled to the front end region (on the left side as viewed in FIG. 1) of the body 103 via a tool holder (not shown), and a main handle in the form of a handgrip 109 connected to the body 103 on the side opposite to the hammer bit 119 and designed to be held by a user. The body 103 and the hammer bit 119 are features that correspond to the "tool body" and the "tool bit", respectively, according to the present invention. The hammer bit 119 is held by the tool holder via a chuck 108 such that it is allowed to reciprocate with respect to the tool holder in its axial direction and prevented from rotating with respect to the tool holder in its circumferential direction. For the sake of convenience of explanation, in the hammer 101, the side of the hammer bit 119 is taken as the front and the side of the main handle 109 as the rear.

The body 103 mainly includes a housing 105 and a generally cylindrical barrel 107 connected to the front of the housing 105. The body 103 houses a driving motor, a motion converting mechanism in the form of a crank mechanism which converts rotation of the driving motor into linear motion, and a striking mechanism which is driven by the crank mechanism and includes a striker (striking element) for striking the hammer bit 119 in the axial direction and an impact bolt (intermediate element) for transmitting the striking movement of the striker to the hammer bit 119.

In the hammer 101 constructed as described above, when the driving motor is driven, a striking force is applied to the hammer bit 119 in the axial direction from the crank mechanism via the striking mechanism. Thus, the hammer bit 119 performs an operation (chipping operation) on a workpiece (concrete) by a hammering movement in the axial direction.

Figure 4:
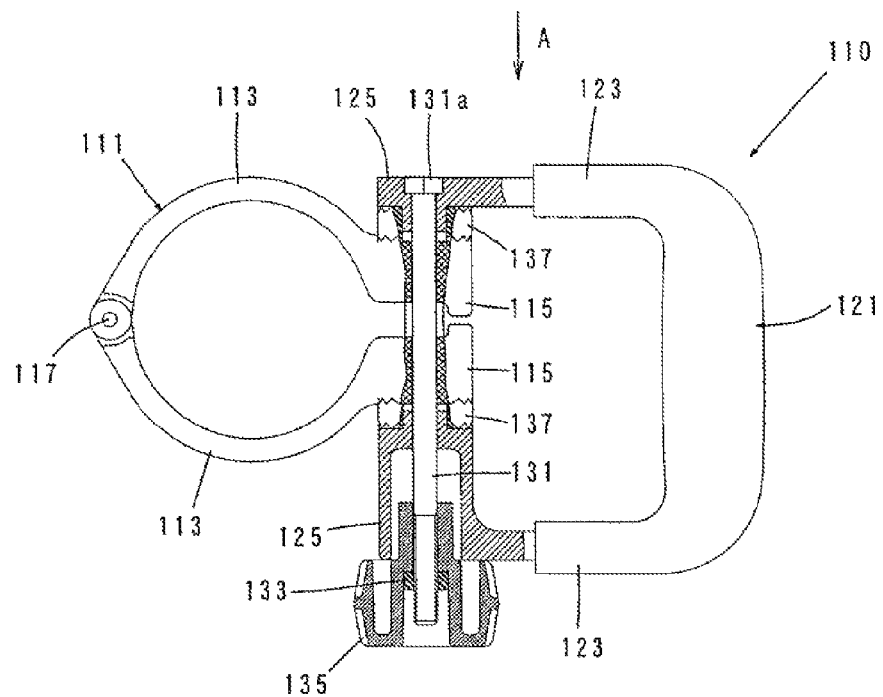
FIG. 4 is a partially sectional view showing the entire structure of a side handle.
Figure 5:
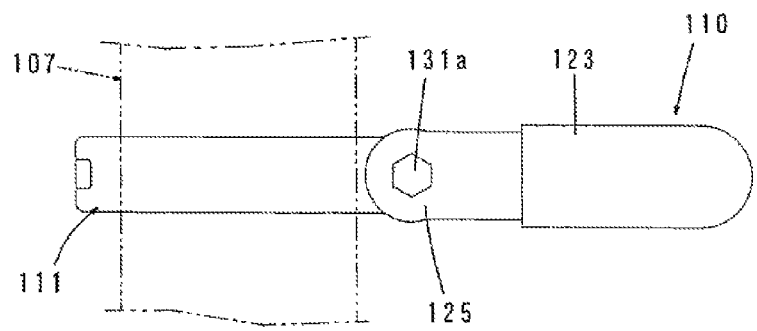
FIG. 5 is a view taken from the direction of arrow A in FIG. 4.

The auxiliary handle in the form of the side handle 110 to which the dust collecting device 140 is attached is now explained with reference to FIGS. 4 and 5. The side handle 110 is detachably mounted onto the barrel 107 of the hammer 101. The side handle 110 mainly includes a mounting ring 111 which is mounted onto the generally cylindrical barrel 107 by holding the outer circumferential surface of the barrel 107 from the outside, a grip 121 connected to the mounting ring 111 and designed to be held by a user, and a fastening means which includes a through bolt 131 and a fastening knob 135 with a nut 133 and serves to clamp and loosen the mounting ring 111.

The mounting ring 111 includes a pair of upper and lower generally semicircular arc ring components 113. The pair ring components 113 are rotatably connected at one end with respect to each other via a shaft 117 which extends parallel to the longitudinal direction of the barrel 107. An outwardly protruding base 115 is formed on the other free end of each of the ring components 113.

The grip 121 has a rod-like shape having a generally circular section and has upper and lower arms 123 which extend in parallel to each other from the both ends of the grip 121 in the longitudinal direction (the vertical direction as viewed in FIG. 4) toward the mounting ring 111. The bases 115 of the mounting ring 111 are disposed between extending end portions 125 of the upper and lower arms 123 via ring-like cams 137. The through bolt 131 is loosely inserted in the vertical direction through holes formed in the extending end portions 125, the cams 137 and the bases 115. The through bolt 131 has a hexagonal head 131a on one end, and the head 131a engages with an upper surface (bottom of a counterbore) of the extending end portion 125 of the upper arm 123. The other end of the through bolt 131 protrudes a predetermined distance from the extending end portion 125 of the lower arm 123. The nut 133 of the fastening knob 135 is threadingly engaged with a threaded portion of the through bolt 131.

In the side handle 110 constructed as described above, when the mounting ring 111 is loosely fitted onto the barrel 107 and the fastening knob 135 is turned in one direction (tightening direction), the upper and lower extending end portions 125 are clamped (pressed) and moved (deformed), due to elasticity of the arms 123, in a direction that lessens a distance therebetween (toward each other) by using the through bolt 131 and the fastening knob 135 (the nut 133). As a result, the bases 115 are also moved toward each other via the upper and lower cams 137 in a direction that lessens the ring diameter of the ring components 113. Thus, the mounting ring 111 is clamped onto the barrel 107.

When the fastening knob 135 is turned in the other direction (loosening direction), the upper and lower extending end portions 125 and the bases 115 clamped by the through bolt 131 and the fastening knob 135 are released and return to their initial position in which they are not yet clamped, so that the mounting ring 111 us unclamped from the barrel 107. In this state, the side handle 110 can be removed from the barrel 107.

The dust collecting device 140 is now explained with reference to FIGS. 1 to 3. The dust collecting device 140 is attached to the side handle 110 and serves to suck up and collect dust generated during operation on a workpiece. The dust collecting device 140 according to this embodiment mainly includes a dust collecting hood 141 for collecting dust, a dust collecting hose 146 for transferring dust downstream from the dust collecting hood 141, and a hose holder 147 for holding the dust collecting hose 146. The dust collecting hood 141, the dust collecting hose 146 and the hose holder 147 are features that correspond to the "dust collecting part", the "dust transfer part" and the "hose holding part", respectively, according to the present invention.

Figure 2:
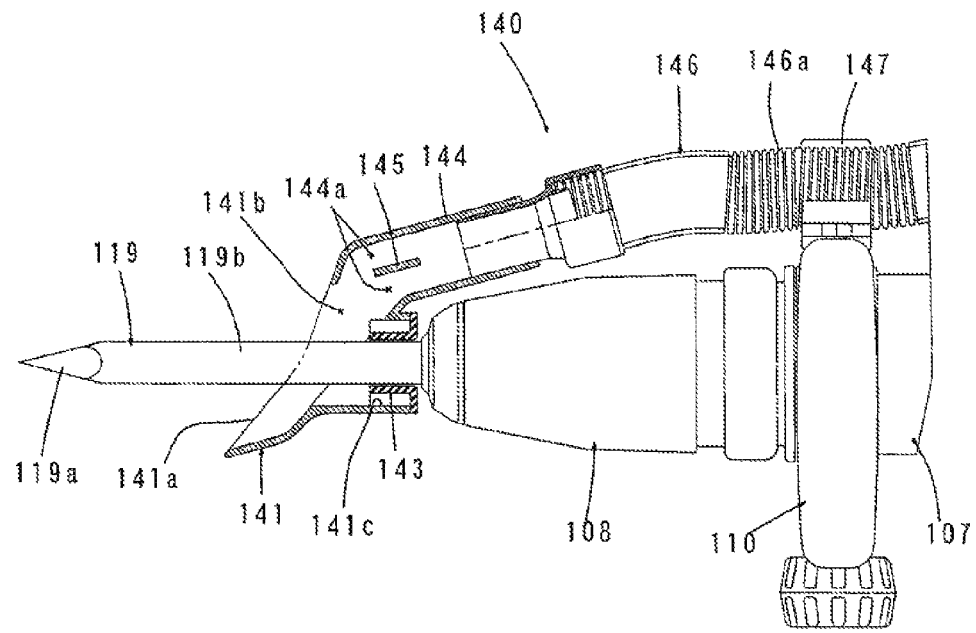
FIG. 2 is a sectional view showing the entire structure of the dust collecting device.
Figure 3:
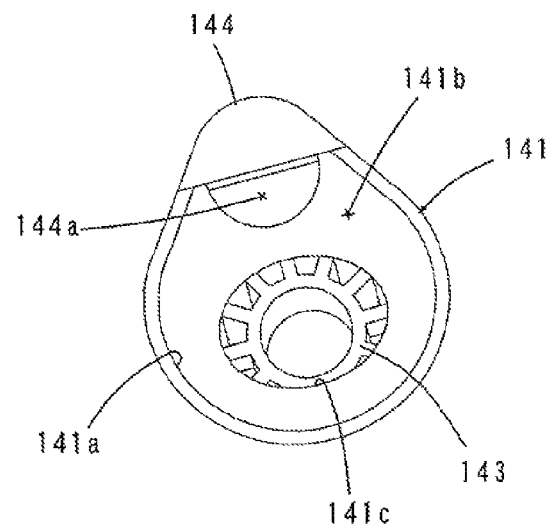
FIG. 3 is a front view showing the configuration of a front end of a dust collecting hood.

As shown in FIGS. 2 and 3, the dust collecting hood 141 is a generally cup-like member (generally cylindrical member with a bottom) which is arranged to surround the hammer bit 119 entirely around its axis with a predetermined clearance in the radial direction and has an internal space 141b with an open front end formed as a dust suction port 141a. On its bottom (on the side opposite from the dust suction port 141a), the dust collecting hood 141 has a through hole 141c extending in the axial direction of the hammer bit and formed for mounting a cylindrical sliding member 143 therein, and a hose connecting part 144 formed adjacent to the through hole 141c.

The cylindrical sliding member 143 is a guiding member for the dust collecting hood 141 and has a bore which is slidably fitted onto a shank 119b of the hammer bit 119. The cylindrical sliding member 143 is detachably fitted in the through hole 141c of the dust collecting hood 141. The dust suction port 141a of the dust collecting hood 141 is disposed at a predetermined distance away from a bit tip 119a of the hammer bit 119 by fitting the cylindrical sliding member 143 onto the hammer bit 119 from the front. The bore inner wall surface of the cylindrical sliding member 143 is slidably engaged with the outer surface of the shank of the hammer bit 119. Thus, the dust collecting hood 141 is held on the shank 119b of the hammer bit 119, while being allowed to move in the axial direction with respect to the hammer bit 119 via the cylindrical sliding member 143.

The hose connecting part 144 has an open front end formed as a dust inlet into the internal space 141b of the dust collecting hood 141. The hose connecting part 144 extends rearward to a predetermined length along the outer contour (tapered cylindrical shape) of the chuck 108. The hose connecting part 144 has an open rear end formed as a dust outlet, and the dust collecting hose 146 is detachably inserted in and connected to the dust outlet. Further, a partition 145 is formed in a front end region of the hose connecting part 144 and serves to partition a passage of the hose connecting part 144 into several parts. The hose connecting part 144 is partitioned into passages 144a by the partition 145 such that the flow passage sectional area of each passage 144a is smaller than the minimum flow passage sectional area of the dust collecting hose 146. With this construction, a large piece of dust (chip) is blocked by the partition 145 and prevented from entering the dust collecting hose 146, so that clogging of the hose can be avoided.

As shown in FIG. 3, the dust collecting hood 141 has a generally elliptical shape in front view (when viewed from the bit tip of the hammer bit 119). Further, as shown in FIG. 2, the front end region (the dust suction port 141a side) of the dust collecting hood 141 includes a region on a connecting part side for connection with the dust collecting hose 146 and a region on the opposite side of the hammer bit 119 from the connecting part side. The front end region of the dust collecting hood 141 is inclined such that it extends away from the bit tip 119a of the hammer bit 119 on the connecting part side, while extending toward the bit tip on the opposite side. Specifically, the front end region of the dust collecting hood 141 has an inclined circumferential shape on the dust suction port 141a side such that the region on the hose connecting part 144 side extends away from the bit tip 119a. With this configuration, visibility of the bit tip 119a (a work area of the workpiece) can be improved when it is viewed over the hose connecting part 144, and dust sucked up into the dust collecting hood 141 can be smoothly led into the hose connecting part 144.

The dust collecting hose 146 is a tubular member made of rubber or resin and having a bellows-like part 146a formed at least in part of the dust collecting hose 146. The dust collecting hose 146 is connected to the dust collecting hood 141 by inserting one (front) end of the dust collecting hose 146 into the dust outlet of the hose connecting part 144. The dust collecting hose 146 extends along the body 103 of the hammer 101 generally in the axial direction of the hammer bit 119 and is held on the barrel 107 via the side handle 110 by the hose holder 147. Further, the dust collecting hose 146 is connected to a dust collector (not shown) at least during operation. In this manner, the dust collecting device 140 of this embodiment is constructed to be held on the hammer 101 at two points in the longitudinal direction such that the dust collecting hose 146 is held on the body 103 and the dust collecting hood 141 is held on the hammer bit 119. Further, in this embodiment, the dust collecting hose 146 is connected to a dust collector formed separately from the hammer 101, but it may be connected otherwise. For example, if the hammer 101 has a suction device including a motor and a motor-driven dust collecting fan, or if the dust collecting device itself has a suction device including a motor and a motor-driven dust collecting fan, the dust collecting hose 146 may be connected to the suction device.

Figure 6:
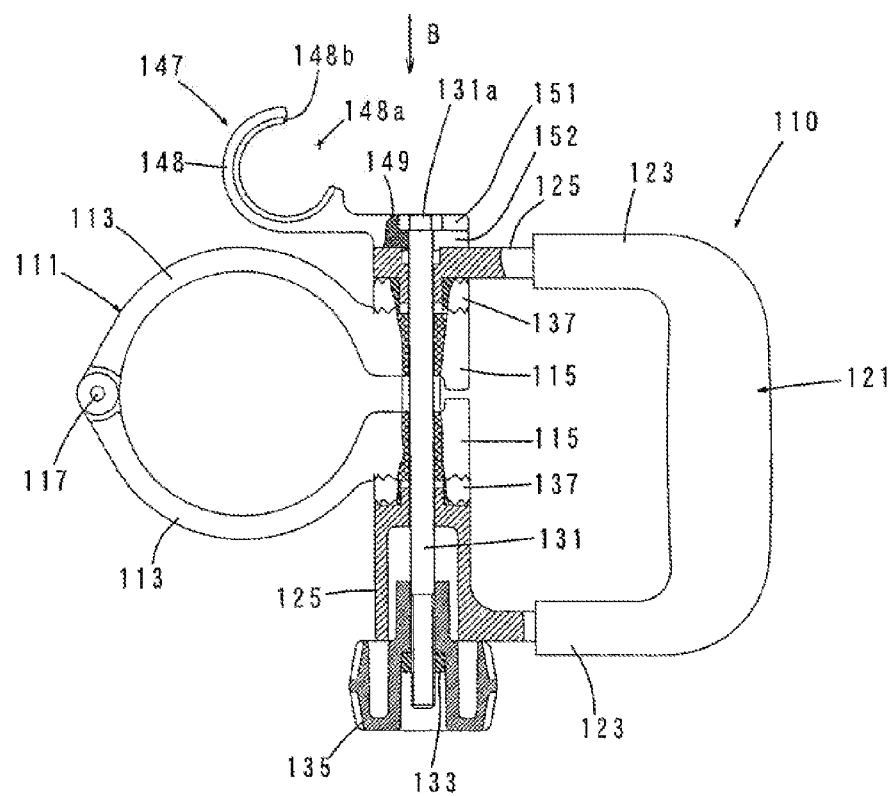
FIG. 6 is a partially sectional view showing a structure of mounting the dust collecting device to the side handle.
Figure 7:
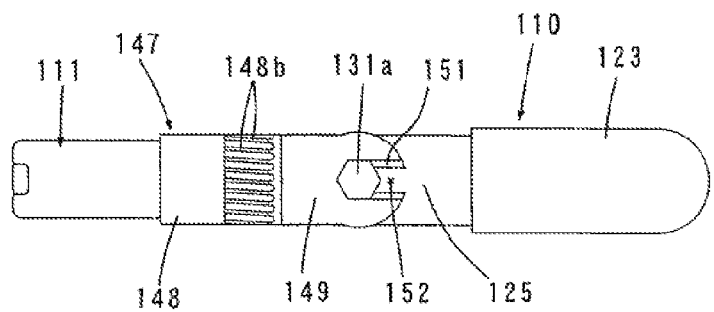
FIG. 7 is a view in the direction of arrow B in FIG. 6.

As shown in FIGS. 6 and 7, the hose holder 147 has a hose holder body 148 for holding the dust collecting hose 146 and a plate-like mounting base 149 extending from the hose holder body 148. The hose holder body 148 is a generally circular ring-like member having a hose attachment/removal opening 148a. A plurality of circumferentially extending rib-like projections 148b are formed on an inner circumferential surface of the hose holder body 148 and can engage with valleys of the bellows-like part 146a of the dust collecting hose 146. The opening width of the hose attachment/removal opening 148a in the circumferential direction is slightly smaller than the hose diameter. Therefore, in order to attach and remove the hose with respect to the hose holder body 148 through the opening 148a, the bellows-like part 146a is deformed into a generally elliptical form. The dust collecting hose 146 held by the hose holder body 148 is locked against axial movement by engagement between the projections 148b and the valleys of the bellows-like part 146a.

The mounting base 149 is inserted between a head 131a of the through bolt 131 and the upper arm 123 of the grip 121 in the side handle 110 and fastened to the side handle 110. The mounting base 149 can be removed from the side handle 110 when the through bolt 131 is loosened. For this purpose, as shown in FIGS. 6 and 7, the mounting base 149 has a notch 151 and a recessed engagement part 152. The notch 151 is generally U-shaped in planar view and can be fitted onto the through bolt 131 from a radial direction. The recessed engagement part 152 is formed along a peripheral edge of an upper surface of the notch 151, engaged with the head 131a of the through bolt 131 fitted in the notch 151 and locked against rotation relative to the head 131a. Therefore, when the through bolt 131 is loosened, the hose holder 147 can be turned about 360 degrees around the through bolt 131, so that its position can be adjusted around the bolt axis. When the hose holder 147 is set in a predetermined position around the axis of the through bolt 131, the through bolt 131 is tightened by turning the fastening knob 135, the through bolt 131 which is engaged with the recessed engagement part 152 at the head 131a and locked against rotation is moved toward the fastening knob 135. In this manner, the mounting base 149 is fastened to the side handle 110 between the head 131a of the through bolt 131 and the upper arm 123.

The dust collecting device 140 according to this embodiment is constructed as described above. When a dust collector is driven and the hammer 101 is driven to perform a chipping operation on a workpiece by linear hammering movement of the hammer bit 119, the dust collecting device 140 can collect dust generated during the operation. Specifically, dust generated by the hammer 101 is sucked up into the dust collecting hood 141 through the dust suction port 141a and collected in the dust collector via the hose connecting part 144 of the dust collecting hood 141 and the dust collecting hose 146.

In chipping operation, hammer bits 119 of different lengths are used according to the operation conditions. In consideration of this, in this embodiment, the position of the front end of the dust collecting hood 141 (the position of the dust suction port 141a) can be adjusted with respect to the hammer bit 119 by changing the position in which the hose holder 147 holds the dust collecting hose 146. Thus, the dust suction port 141a can be positioned at an adequate distance from the bit tip of the hammer bit 119 to be used. As a result, such a problem that the dust collecting efficiency is reduced by increase of the distance between the dust suction port 141a and a dust generation area can be eliminated. According to this embodiment the hammer bits 119 having different lengths can be accommodated without reducing the dust collecting ability, and a plurality of dust collecting hoods 141 are not needed.

Further, the hammer bits 119 are available in several types varying in length and in several types varying in the diameter of the shanks 119b. In consideration of this, in this embodiment, the cylindrical sliding member 143 is detachably fitted in the through hole 141c of the dust collecting hood 141. Further, a plurality of cylindrical sliding members 143 having bores of different diameters are provided to accommodate a plurality of hammer bits 119 having the shanks 119*b* of different diameters. Thus, the cylindrical sliding members 143 can be replaced and mounted in the through hole 141*c* of the dust collecting hood 141 in order to accommodate the hammer bits 119 having the shanks 119*b* of different diameters.

Further, in this embodiment, the dust collecting hose 146 can be attached to and removed from the hose holder body 148 through the hose attachment/removal opening 148*a*, and the dust collecting hose 146 is locked against axial movement and held by engagement between the rib-like projections 148*b* of the hose holder body 148 and the valleys of the bellows-like part 146*a* of the dust collecting hose 146. With this construction, the front end position of the dust collecting hood 141 can be easily adjusted by changing the position of engagement of the bellows-like part 146*a* with respect to the projections 148*b* when attaching the dust collecting hose 146. Further, with the construction in which the dust collecting hose 146 is locked against axial movement by engagement between the rib-like projections 148*b* and the valleys of the bellows-like part 146*a*, the dust collecting hood 141 can be prevented from being displaced by vibration during chipping operation so that it can be reliably and securely held in position.

Further, in this embodiment, the sleeve-like cylindrical sliding member 143 is provided on part of the dust collecting hood 141 and slidably fitted onto the shank 119*b* of the hammer bit 119, and the dust collecting hood 141 is directly guided by the shank 119*b* of the hammer bit 119. With this construction, the dust collecting hood 141 can be held with stability. Further, by provision of the holding stability, the dust collecting hood 141 can be placed closer to an area of dust generation, so that the dust collecting efficiency can be improved.

Further, in this embodiment, the front end region of the dust collecting hood 141 is inclined with respect to the axis of the hammer bit 119. Therefore, when a chipping operation is performed, for example, on a vertical wall, part (the dust collecting hose connection side) of the circumferential region of the dust collecting hood 141 which extends away from the bit tip 119*a* is set to be positioned in the line of sight, or between a user's eye and a work area of the workpiece during operation, so that visibility of the work area of the workpiece can be improved when the work area is viewed over the dust collecting hood 141. Further, part of the circumferential region of the dust collecting hood 141 which extends toward the bit tip 119*a* is placed below the hammer bit 119. With this construction, the dust suction port 141*a* can more easily catch chips which are scattered during chipping operation.

Further, in this embodiment, the dust collecting hood 141 has a generally cup-like shape and is arranged to surround the shank 119*b* entirely around its axis at a distance away from the bit tip 119*a* of the hammer bit 119. With this construction, the dust collecting hood 141 can be made smaller, and visibility of the work area can be improved.

(Second Embodiment of the Invention)

Figure 8:
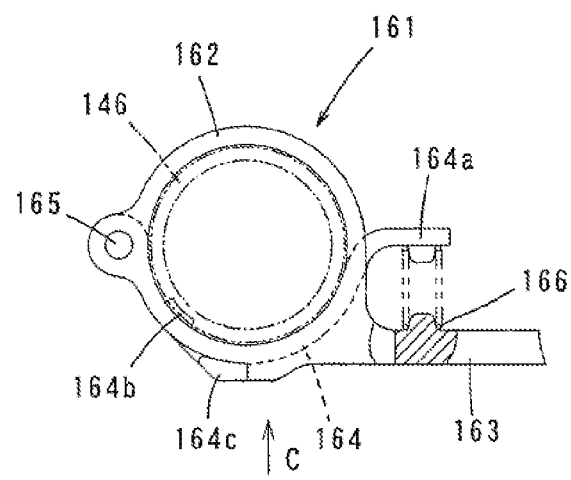
FIG. 8 is a front view showing a hose holder of a dust collecting device according to a second embodiment of the present invention, when the dust collecting hose is locked against movement.
Figure 9:
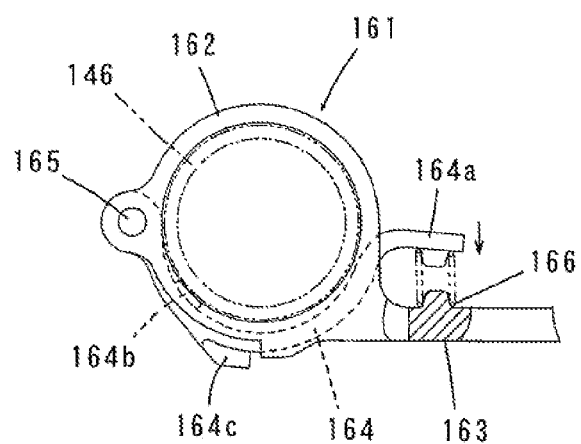
FIG. 9 is a front view also showing the hose holder when the dust collecting hose is unlocked.
Figure 10:
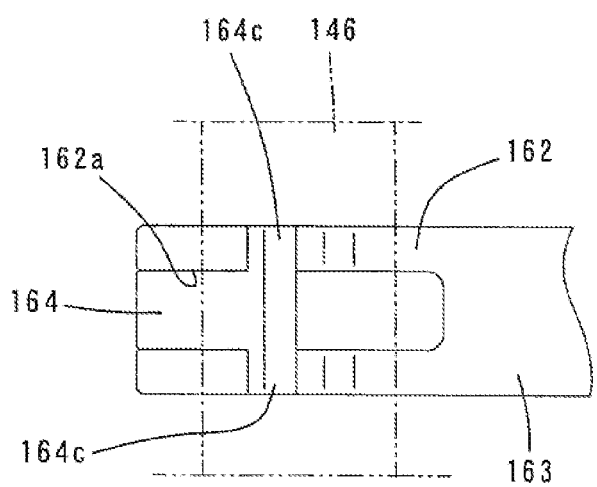
FIG. 10 is a view in the direction of arrow C in FIG. 8.

A dust collecting device according to a second embodiment of the present invention is now described with reference to FIGS. 8 to 10. The second embodiment is a modification to the hose holder 147, which is described in the first embodiment, for holding the dust collecting hose 146 in the dust collecting device. The entire construction of the dust collecting device 140 other than the hose holder is the same as in the first embodiment. A hose holder 161 of this embodiment mainly includes an annular hose holder body 162 which serves to hold the dust collecting hose 146 and through which the dust collecting hose 146 can be inserted, a plate-like mounting base 163 extending from the hose holder body 162, and a semicircular arc locking member 164 for locking the dust collecting hose 146 to the hose holder body 162. The hose holder 161 is a feature that corresponds to the "hose holding part" according to this invention, and the hose holder body 162 and the locking member 164 are features that correspond to the "annular member" and the "engagement member", respectively, according to claim 4 of this invention.

The hose holder body 162 is a circular ring-like member having an inner diameter slightly larger than the outer diameter of the bellows-like part 146*a* of the dust collecting hose 146. The hose holder body 162 has an opening 162*a* (see FIG. 10) formed in the middle in its axial direction and extending over a predetermined area (of about 180 degrees) in the circumferential direction. The locking member 164 has a generally semicircular arc shape having about the same radius of curvature as the inner diameter of the hose holder body 162, and is disposed in the opening 162*a* of the hose holder body 162. One end of the locking member 164 is rotatably connected to the hose holder body 162 by a pin 165. At the other end, the locking member 164 has a protruding end 164*a* protruding radially outward of the hose holder body 162. The protruding end 164*a* faces an upper surface of the mounting base 163. One or more locking projections 164*b* are formed on the inner surface of the locking member 164 and protrude radially inward. The locking projections 164*b* are engaged with the valleys of the bellows-like part 146*a* of the dust collecting hose 146 so that the dust collecting hose 146 is locked against axial movement with respect to the hose bolder body 162. This state is shown in FIG. 8.

A compression coil spring 166 is disposed between the mounting base 163 and the protruding end 164*a* which face each other. Thus, the locking member 164 is biased to turn radially inward such that the locking projections 164*b* are engaged with the valleys of the bellows-like part 146*a* of the dust collecting hose 146. Therefore, the locking projections 164*b* and the valleys of the bellows-like part 146*a* are held in engagement and the dust collecting hose 146 is locked against axial movement. The compression coil spring 166 is a feature that corresponds to the "biasing member" according to this invention. The locking member 164 has a stopper 164*c* for defining the limit to which the locking member 164 can be turned radially inward by the compression coil spring 166. The stopper 164*c* is formed as a projection extending in the axial direction on the outer circumferential surface of the locking member 164. When the locking member 164 is turned radially inward, the stopper 164*c* comes into contact with the outer surface of the hose holder body 162 and prevents the locking member 164 from being further turned.

Further, the protruding end 164*a* of the locking member 164 forms an operation knob. When the protruding end 164*a* is pressed against the biasing force of the compression coil spring 166, the locking member 164 is turned radially outward on the pin 165. Thus, the locking projections 164*b* are disengaged from the bellows-like part 146*a*, so that the dust collecting hose 146 is allowed to move in the axial direction. This state is shown in FIG. 9.

According to this embodiment constructed as described above, after the protruding end 164*a* of the locking member 164 is pressed and the locking projections 164*b* are disengaged from the bellows-like part 146*a* of the dust collecting hose 146, the position of the front end of the dust collecting hood 141 can be adjusted with respect to the hammer bit 119 by moving the dust collecting hose 146 in the axial direction. Once the dust collecting hood 141 is positioned, engagement between the bellows-like part 146*a* and the locking projections 164*b* is maintained by the compression coil spring 166.

Therefore, there exists no risk that the dust collecting hood 141 is unintentionally displaced due to vibration caused by the operation.

(Third Embodiment of the Invention)

Figure 11:
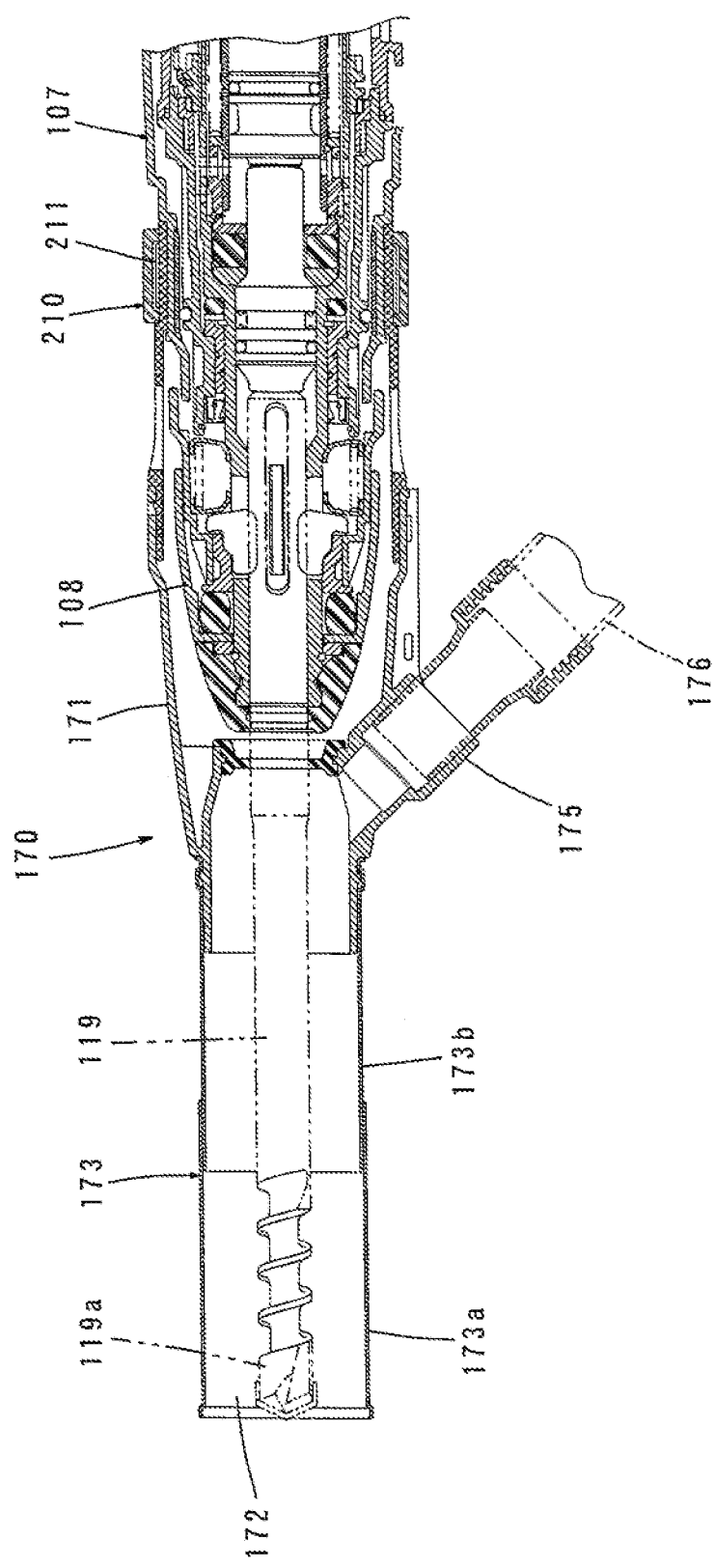
FIG. 11 is a sectional view showing a dust collecting device according to a third embodiment of the present invention.

A dust collecting device 170 according to a third embodiment of the present invention is now described with reference to FIGS. 11 to 13. As shown in FIG. 11, the dust collecting device 170 according to this embodiment mainly includes a generally cylindrical mounting part 171 made of synthetic resin and having open ends in the axial direction, and a generally cylindrical, telescopic dust collecting hood 173 having open ends in the axial direction. The dust collecting hood 173 is connected to one (front) end of the cylindrical mounting part 171 and formed telescopically in the axial direction of the hammer bit 119. The cylindrical mounting part 171 of the dust collecting device 170 is fitted over the front end region of the barrel 107 from the front, and removably mounted together with the side handle 210 on a handle mounting part formed on the outer surface of the front end portion of the barrel 107. The telescopic dust collecting hood 173 is a feature that corresponds to the "bit covering" according to this invention.

In order to mount the side handle 210 (partly shown in FIG. 11) of this embodiment, a band 211 is put around the outer surface of the handle mounting part and tightened by a screw. The dust collecting device 170 is constructed such that the cylindrical mounting part 171 is mounted together with the side handle 210 by the belt 211 when the side handle 210 is mounted on the handle mounting part of the barrel 107. This mounting structure is not directly related to this invention, and therefore its description is omitted here.

The telescopic dust collecting hood 173 of the dust collecting device 170 has a double-cylinder structure having two cylindrical hoods 173a, 173b which are slidably connected (fitted) to each other in the axial direction. The two hoods 173a, 173b are features that correspond to the "plurality of cylindrical members" according to this invention. As shown in FIGS. 12 and 13, the front hood 173a is fitted on the outer surface of the hood 173b on the barrel 107 side. A female thread 174a is formed in the inner surface of the front hood 173a over a predetermined region in the axial direction, and a projection (male thread) 174a is formed on the outer surface of the hood 173b on the barrel 107 side along almost the entire length in the axial direction and engages with the female thread 174a. The projection 174b is a feature that corresponds to the "engagement projection" according to this invention. Specifically, the two hoods 173a, 173b are moved relative to each other by thread engagement between the female thread 174a and the projection 174b. The front end position of the front hood 173a can be adjusted steplessly with respect to the bit tip 119a of the hammer bit 119 by turning the front hood 173a clockwise or counterclockwise with respect to the barrel-side hood 173b. A front opening of the front hood 173a forms a dust suction port 172. FIG. 12 shows the telescopic dust collecting hood 173 set in a fully extended position by moving the front hood 173a forward, and FIG. 13 shows the dust collecting hood 173 set in a fully retracted position by moving the front hood 173a rearward. The barrel side hood 173b is removably fitted at its rear end onto a front end of the cylindrical mounting part 171.

A hose connecting part 175 is formed on the cylindrical mounting part 171 in the vicinity of a connection between the mounting part 171 and the telescopic dust collecting hood 173. A dust collecting hose 176 for transferring dust to a dust collector is removably connected to the hose connecting part 175. Thus, dust generated during chipping operation is sucked up through the dust suction port 172 of the front hood 173a, and collected in the dust collector via the internal space of the telescopic dust collecting hood 173 and the dust collecting hose 176.

In the dust collecting device 170 constructed as described above according to this embodiment, the position of the front hood 173a of the dust collecting device 170 can be adjusted by turning the front hood 173a of the telescopic dust collecting hood 173. Therefore, like in the first embodiment, the hammer bits 119 having different lengths can be accommodated without reducing the dust collecting ability. Further, due to stepless position adjustment by using the threads, an adequate position of the hood with respect to the bit tip 119a can be easily obtained.

Further, in this embodiment, the female thread 174a is formed over the entire circumference of the inner surface of the end region of the front hood 173a for connection with the barrel side hood 173b, and the projection 174b is formed on part of the outer surface of the barrel side hood 173b in the circumferential direction and along the entire length in the axial direction. With this construction, the threaded area can be reduced, so that the manufacturing costs can be reduced. Further, the above-described arrangement of the threads can be provided vice versa. Specifically, the projection 174b may be formed on the area for the female thread 174a, and the female thread 174 may be formed in the area for the projection 174a.

Figure 14:
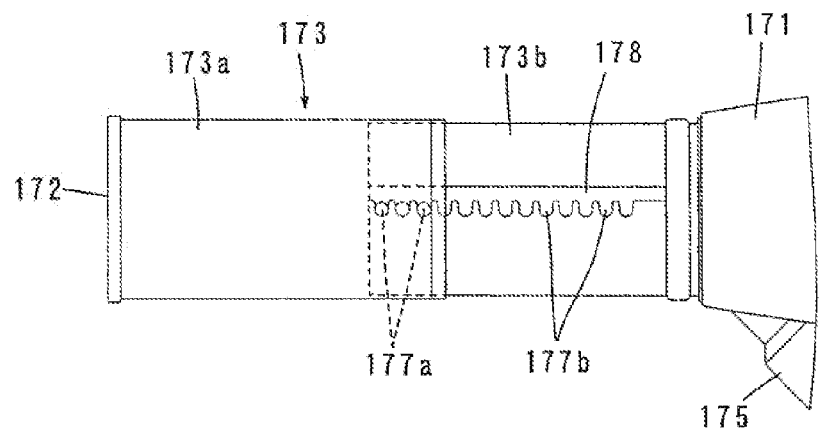
FIG. 14 is an external view showing a modification to the telescopic dust collecting hood according to the third embodiment, in a fully extended position.
Figure 15:
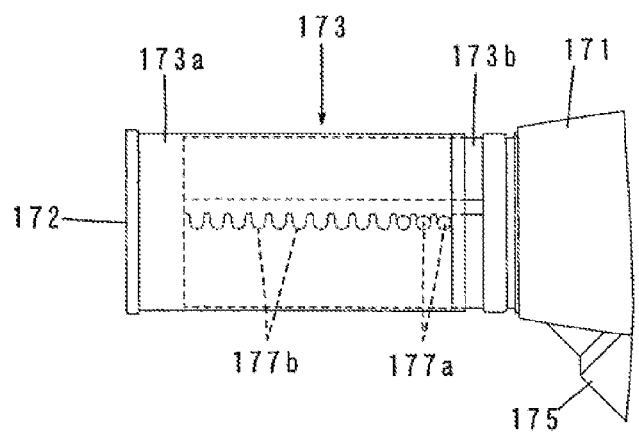
FIG. 15 is an external view also showing the modification of the telescopic dust collecting hood in a fully retracted position.
Figure 16:
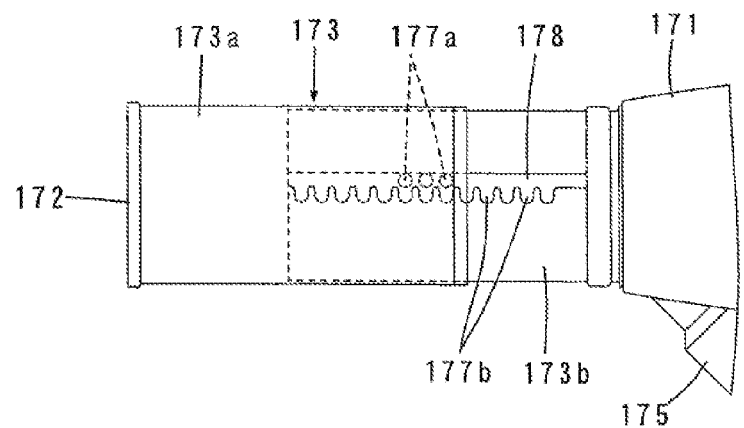
FIG. 16 is an external view also showing the modification of the telescopic dust collecting hood in a position in which it is allowed to be extended and retracted.

Now, a modification to the telescopic dust collecting hood 173 of the dust collecting device 170 according to the third embodiment is described with reference to FIGS. 14 to 16. In this modification, the front hood 173a of the telescopic dust collecting hood 173 is fitted on the barrel side hood 173b. The front hood 173a has projections 177a, and the barrel side hood 173b has recesses 177b which can be engaged with the projections 177a. Relative movement of the hoods 173a, 173b in the axial direction is prevented by engagement between the projections 177a and the recesses 177b, while it is allowed by disengagement therebetween. Engagement and disengagement between the projections 177a and the recesses 177b are effected by turning the front hood 173a around its axis with respect to the barrel side hood 173b. FIGS. 14 and 15 show the projections 177a and the recesses 177b in the engaged position, and FIG. 16 shows them in the disengaged position. In this disengaged position, the position of the hood front end can be adjusted.

A slit 178 is formed in the barrel side hood 173b in the axial direction, and the recesses 177b are formed in one edge of the slit 178 along almost the entire length. The recesses 177b have a generally semicircular, U-shaped or V-shaped form which is open into the slit 178 and are arranged in series at predetermined intervals. The projections 177a are formed on the inner surface of an end region of the front hood 173a for connection with the barrel side hood 173b and have a semispherical or cylindrical form protruding inward. The projections 177a are placed in the slit 178 of the barrel side hood 173b. Therefore, the slit 178 has a width large enough to allow movement of the projections 177a in the axial direction. Further, although, in this embodiment, the slit 178 and the recesses 177b are formed in the barrel side hood 173b and the projections 177a are formed in the front hood 173a, the projections 177a may be formed in the barrel side hood 173b and the slit 178 and the recesses 177b may be formed in the front hood 173a.

Figure 12:
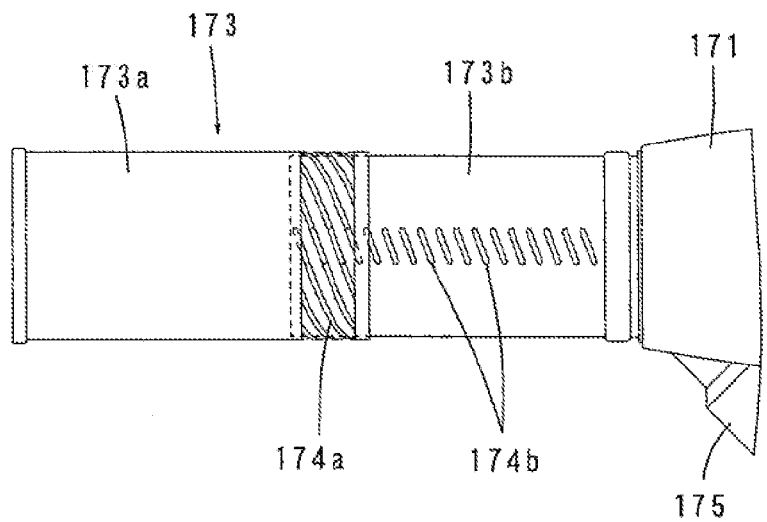
FIG. 12 is an external view showing a telescopic dust collecting hood in a fully extended position.
Figure 13:
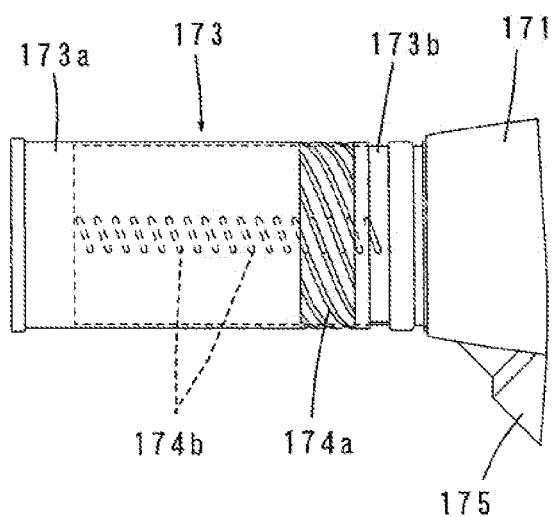
FIG. 13 is an external view showing the telescopic dust collecting hood in a fully retracted position.

This modification is constructed as described above, and in the other points, it has the same construction as the dust collecting device 170 of the third embodiment shown in FIGS. 11 to 13. According to this modification, in the dust collecting device 170 having the telescopic dust collecting hood 173, multistep adjustment of the position of the front end of the front hood 173a or the position of the dust suction port 172 with respect to the bit tip 119a of the hammer bit 119 can be realized by engagement between the projections 177a and the recesses 177b. Therefore, like in the third embodiment, the hammer bits 119 having different lengths can be accommodated without reducing the dust collecting ability.

Figure 17:
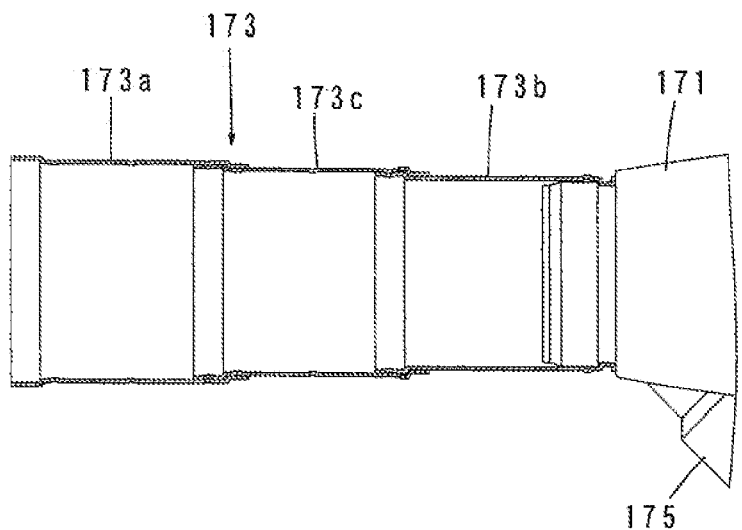
FIG. 17 is a sectional view showing a second modification to the telescopic dust collecting hood according to the third embodiment, in a fully extended position.
Figure 18:
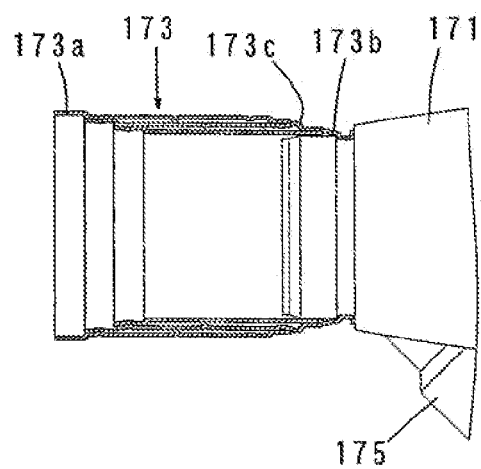
FIG. 18 is a sectional view also showing the second modification of the telescopic dust collecting hood in a fully retracted position.

Next, another modification to the telescopic dust collecting hood 173 of the dust collecting device 170 according to the third embodiment is described with reference to FIGS. 17 to 19. In this modification, the telescopic dust collecting hood 173 includes at least three hoods, or a front hood 173a, a barrel side hood 173b and an intermediate hood 173c. The front hood 173a is fitted on the intermediate hood 173c, and the intermediate hood 173c is fitted on the barrel side hood 173b. The three hoods 173a, 173b, 173c can be telescopically slid with respect to each other in the axial direction.

Figure 19:
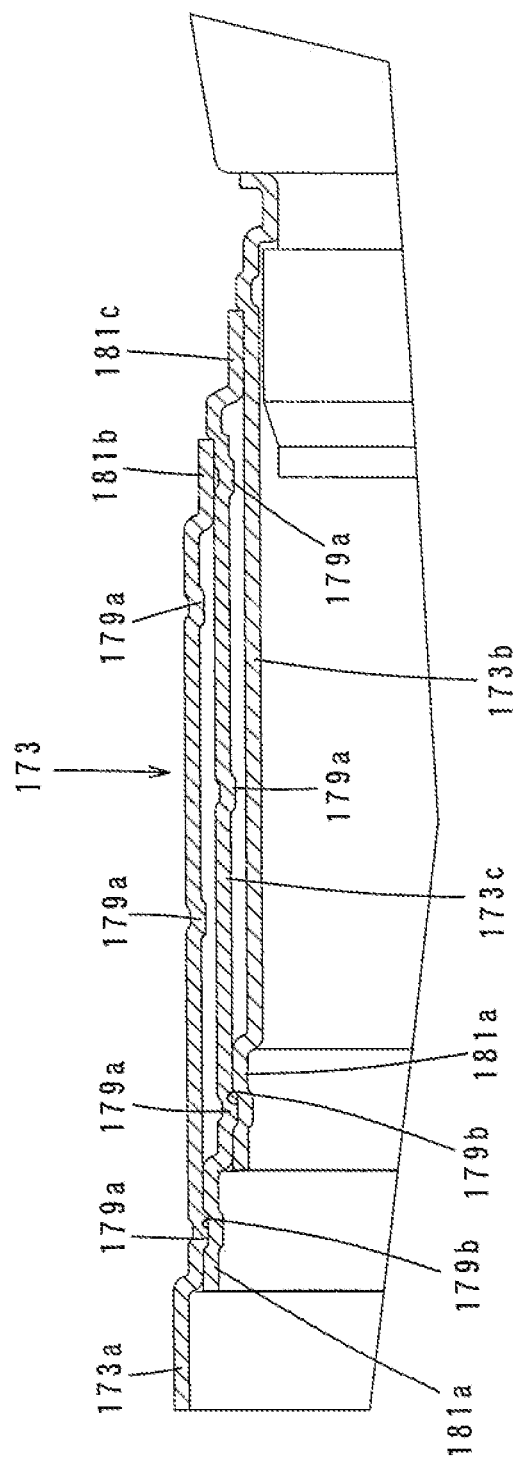
FIG. 19 is an enlarged partial view of FIG. 18.

As shown in an enlarged partial view of FIG. 19, a circumferentially extending annular recess 179b is formed in a front end region of the outer surface of each of the barrel side hood 173b and the intermediate hood 173c. A plurality of (three in this embodiment) annular projections 179a are formed for engagement with the recess 179b on the inner surface of each of the intermediate hood 173c and the front hood 173a at predetermined intervals in the axial direction. When the front hood 173a is slid with respect to the intermediate hood 173c in the axial direction, any one of the projections 179a of the front hood 173a is engaged with the recess 179b of the intermediate hood 173c. Similarly, when the intermediate hood 173c is slid with respect to the barrel side hood 173b in the axial direction, any one of the projections 179a of the intermediate hood 173c is engaged with the recess 179b of the barrel side hood 173b.

In this embodiment, the positions of the front hood 173a and the intermediate hood 173c can be adjusted in the axial direction in the same multiple number of steps as the number of their respective projections 179a (three steps each). Each of the front hood 173a and the intermediate hood 173c is held in an adjusted position in which the projection 179a is engaged with the recess 179b. The projections 179a and the recesses 179b are engaged and disengaged by elastic deformation of the hoods 173a, 173b, 173c.

Each of the intermediate hood 173c and the barrel side hood 173b has a hood front end region 181a having the recess 179b. The hood front end region 181a has a diameter larger than the other region of the hood, so that the projections 179a can be avoided from interfering with the region other than the hood front end region 181a when passing therethrough. Further, a sliding region 181b is formed on a body side end of the front hood 173a and held in sliding contact with the outer surface of the intermediate hood 173c. A sliding region 181c is formed on a body side end of the intermediate hood 173c and held in sliding contact with the outer surface of the barrel side hood 173b. By provision of the sliding regions 181b, 181c, the front hood 173a and the intermediate hood 173c can be moved with stability in the axial direction.

This modification is constructed as described above, and in the other points, it has the same construction as the dust collecting device 170 of the third embodiment shown in FIGS. 11 to 13.

According to this modification, in the dust collecting device 170 having the telescopic dust collecting hood 173, multistep adjustment of the position of the front end of the front hood 173a or the position of the dust suction port 172 with respect to the bit tip 119a of the hammer bit 119 can be realized by engagement between the projections 179a and the recesses 179b. Therefore, like in the third embodiment, the hammer bits 119 having different lengths can be accommodated without reducing the dust collecting ability.

Further, in the above-described embodiments, the electric hammer in which the hammer bit 119 performs only hammering movement in the axial direction is explained as a representative example of the impact tool according to the present invention, but the present invention can also be applied to a hammer drill which can switch between hammering mode in which the hammer bit 119 performs hammering movement and hammer drill mode in which it performs hammering movement in the axial direction and hammer drill movement in the circumferential direction.

In view of the scope and spirit of the above-described invention, the following features can be provided.

(1)

"A dust collecting device that is attached to an impact tool and collects dust generated by the impact tool in which a tool bit coupled to a front end region of a tool body is caused to rectilinearly move in an axial direction of the tool bit, comprising:

a dust suction port through which dust is sucked up and which can be adjusted in position in the axial direction of the tool bit according to a length of the tool bit in the axial direction, so that the tool bits having different lengths can be accommodated without reducing the dust collecting ability."

DESCRIPTION OF NUMERALS 101 electric hammer (impact tool)
103 body
105 housing
107 barrel
108 chuck
109 handgrip (main handle)
110 side handle
111 mounting ring
113 ring component
115 base
117 shall
119 hammer bit (tool bit)
119a bit tip
119b shank
121 grip
123 arm
125 extending end portion
131 through bolt
131a head
133 nut
135 listening knob
137 cam
140 dust collecting device
141 dust collecting hood (dust collecting part)
141a dust suction, port
141b internal space
141c through hole
143 cylindrical sliding member
144 hose connecting part
144a passage
145 partition
146 dust collecting hose (dust transfer part)
146a bellows-like part
147 hose holder (hose holding part)
148 hose holder body
148a hose attachment/removal opening
148b projection
149 mounting base
151 notch 152 recessed engagement part
161 hose holder (hose holding part)
162 hose holder body
162a opening
163 mounting base
164 locking member
164a protruding end (operating part)
164b locking projection (engagement member)
164c stopper
165 pin
166 compression coil spring
170 dust collecting device
171 cylindrical mounting part
172 dust suction port
173 telescopic dust collecting hood (bit covering)
173a front hood
173b barrel side hood
173c intermediate hood
174a female thread
174b projection (engagement projection)
175 hose connecting part
176 dust collecting hose
177a projection
177b recess
178 slit
179a projection
179b recess
181a hood front end region
181b sliding region
181c sliding region

The invention claimed is:

1. A dust collecting device that is attached to an impact tool and collects dust generated by the impact tool in which a tool bit coupled to a front end region of a tool body is caused to rectilinearly move in an axial direction of the tool bit, comprising:
a dust suction port through which dust is sucked up and which can be adjusted in position in the axial direction of the tool bit according to a length of the tool bit in the axial direction,
a dust collecting part having the dust suction port at its front end,
a dust transfer part which is connected to the dust collecting part in order to transfer dust downstream from the dust suction port, the dust transfer part comprising a dust collecting hose which extends in the axial direction of the toll bit and has a bellow-like part formed at least in part of the dust collecting hose, and
a hose holding part which can be mounted to the tool body and engaged with the bellow-like part so as to hold the dust collecting hose on the tool body,
wherein the position of the dust suction part in the axial direction of the tool bit can be adjusted by changing as engagement position of the bellow-like part in an axial direction with respect to the hose holding part.

2. The dust collecting device as defined in claim 1, wherein the hose holding part includes an annular member through which the dust collecting hose is loosely inserted, an engagement member which is formed on the annular member and can be engaged with the bellows-like part, and a biasing member which constantly biases the engagement member in a direction in which the engagement member is engaged with the bellows-like part, and wherein the engagement member can be moved in a radial direction of the annular member between a position of engagement with the bellows-like part and a position of disengagement from the bellows-like part.

3. An impact tool having the dust collecting device as defined in claim 1.

4. A dust collecting device that is attached to an impact tool and collect dust generated by the impact toll in which a tool bit coupled to a front end region of a tool body is caused to rectilinearly move in a axial direction of the tool bit, comprising:
a dust suction port through which dust is sucked up and which can be adjusted in position in the axial direction of the tool bit according to a length of the tool bit in the axial direction,
a bit covering which is arranged to surround the tool bit and has the dust suction port formed at its front end,
wherein the bit covering comprises a plurality of cylindrical members which are fitted one on the other and can be moved relative to each other in the axial direction of the tool bit, and the position of the dust suction port can be adjusted by relative movement of the cylindrical members, and
the plurality of cylindrical members are configured to be moved relative to each other thereby adjusting the position of the dust suction port in the axial direction of the tool bit and also configured to maintain the adjusted position of the dust suction port during a processing operation after the position adjustment.

5. The dust collecting device as defined in claim 4, wherein a female thread is formed in one of the cylindrical members and an engagement projection is formed on the other and engages with the female thread, and when turned relative to each other in the circumferential direction, the cylindrical members can be moved relative to each other in the axial direction by engagement between the female thread and the engagement projection.

6. The dust collecting device as defined in claim 4, wherein the cylindrical members can be moved relative to each other in the axial direction and the circumferential direction, and one of the cylindrical members has a recess and the other has a projection which can be engaged with and disengaged from the recess by relative movement of the cylindrical members in the circumferential direction, and wherein at least one of the recess and the projection is arranged in plurality in the axial direction of the cylindrical members.

7. The dust collecting device as defined in claim 4, wherein the cylindrical members can be telescopically slid with respect to each other in the axial direction, and a projection is formed on one of a sliding inner surface of one cylindrical member and a sliding outer surface on the other adjacent cylindrical member, and a recess is formed in the other of the sliding inner surface and the sliding outer surface and can be engaged with and disengaged from the projection by elastic deformation, and wherein the adjacent cylindrical members are held in the engaged position by engagement between the projection and the recess.

* * * * *